(12) United States Patent
Iwao et al.

(10) Patent No.: US 7,428,811 B2
(45) Date of Patent: Sep. 30, 2008

(54) TORQUE CONVERTER

(75) Inventors: Nobuyuki Iwao, Kanagawa (JP);
Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 145 days.

(21) Appl. No.: 10/579,759

(22) PCT Filed: Nov. 11, 2004

(86) PCT No.: PCT/JP2004/017116

§ 371 (c)(1),
(2), (4) Date: May 18, 2006

(87) PCT Pub. No.: WO2005/052410

PCT Pub. Date: Jun. 9, 2005

(65) Prior Publication Data

US 2007/0084689 A1    Apr. 19, 2007

(30) Foreign Application Priority Data

Nov. 26, 2003    (JP) .............................. 2003-395108

(51) Int. Cl.
*F16D 33/02* (2006.01)
(52) U.S. Cl. .......................................... 60/345; 60/352
(58) Field of Classification Search .................... 60/341, 60/342, 345, 346, 347, 352, 364, 365, 366
See application file for complete search history.

(56) References Cited

U.S. PATENT DOCUMENTS

| 3,901,030 A | * | 8/1975 | Wonn ........................... 60/341 |
| 6,053,843 A | | 4/2000 | Van Vuuren et al. |
| 6,814,195 B2 | | 11/2004 | Yoshimoto et al. |

FOREIGN PATENT DOCUMENTS

| CN | 1296141 A | 5/2001 |
| JP | 58-53517 | 3/1983 |
| JP | 64-761 | 1/1989 |
| JP | 11-151957 | 6/1999 |
| JP | 11-200910 | 7/1999 |
| JP | 2002-276694 | 9/2002 |

OTHER PUBLICATIONS

Form PCT/ISA/210 (International Search Report dated Jan. 11, 2005, with English translation).
Chinese Office Action Dated Dec. 12, 2007.

* cited by examiner

*Primary Examiner*—Michael Leslie
(74) *Attorney, Agent, or Firm*—McGinn IP Law Group, PLLC

(57) ABSTRACT

A torque converter comprises a pump having a pump shell and impellers; a turbine having a turbine shell and runners; a stator arranged between the pump and the turbine and is supported by the housing; and an operation fluid filled in the pump and in the turbine. Transmission torque limit means is arranged between the stator and the housing to so limit the transmission of torque transmitted to the stator as will not to increase in excess of a predetermined value.

1 Claim, 4 Drawing Sheets

TORQUE CONVERTER

TECHNICAL FIELD

The present invention relates to a torque converter for transmitting the rotational torque of a prime mover.

BACKGROUND ART

A power transmission device using a fluid coupling is representatively constituted by an engine mounted on a vehicle, a fluid coupling, a wet friction clutch and a manual transmission, which are arranged in series. The fluid coupling provided for the power transmission device for a vehicle comprises a pump having a pump shell coupled to a crank shaft of an engine such as a diesel engine, i.e., coupled to the input shaft of the fluid coupling, and a plurality of impellers radially arranged in the pump shell; and a turbine having a turbine shell arranged facing the pump and mounted on an output shaft arranged in concentric with the input shaft, and a plurality of runners radially arranged in the turbine shell. The fluid coupling contains an operation fluid for transmitting the torque (e.g., see JP-A-2002-276694).

The fluid coupling is used for the power transmission device to absorb fluctuation in the engine rotational speed and vibration, and is applied as a start clutch for the above type of power transmission device that is used being combined to an NA diesel engine having a relatively large displacement. To cope with the exhaust gas regulations that are becoming ever stringent and the demand for better fuel efficiency, however, it is expected that the future tendency will be to use highly supercharged diesel engines (TC diesel engines) of small displacements. As compared to NA diesel engines having relatively large displacements, the TC diesel engines produce small torques when idling. Therefore, it is not desired to use a fluid coupling having a large drag torque as a start clutch. A drag torque, usually, stands for the transmission of torque of when the engine is running at an idling speed (e.g., 500 rpm). A large drag torque causes the engine to lose stability to a conspicuous degree when it is idling. Besides, the unstable revolution becomes a cause of producing abnormal vibration in the drive system. Further, a large drag torque causes the fuel efficiency to be deteriorated during the idling operation.

From the standpoint of line-up alignment of the transmission, further, it has been desired to provide a torque range which is as wide as possible by using a single kind of the transmission.

When the above-mentioned type of power transmission device is used for a TC diesel engine of a small displacement, the problem of drag torque can be tamed by using, as the start clutch, a fluid coupling of the type of variable capacity capable of decreasing the drag torque. In order to meet the demand for imparting a torque range as wide as possible by using a single kind of transmission, on the other hand, it is desired to use a torque converter as the start clutch rather than to use the fluid coupling. However, the above-type of power transmission device is combined with a manual transmission. When the torque converter having general characteristics is simply used, therefore, the torque becomes so great on the amplified output side as to exceed a permissible input limit of the transmission arousing a problem from the standpoint of strength.

DISCLOSURE OF THE INVENTION

It is an object of the present invention to provide a novel torque converter which makes it possible to widen the torque range of the transmission within a limit of permissible input of the transmission and, besides, to decrease the drag torque by so controlling the transmission of torque transmitted to the stator from the pump through the turbine as will not to exceed the limit of permissible input of the transmission.

According to the present invention, there is provided a torque converter comprising:

a pump having an annular pump shell mounted on a pump hub supported in a housing so as to rotate, and a plurality of impellers radially arranged in the pump shell;

a turbine having an annular turbine shell arranged facing the pump and mounted on a turbine hub which rotates relative to the pump hub, and a plurality of runners radially arranged in the turbine shell;

a stator arranged between the pump and the turbine and is supported by the housing; and an operation fluid filled in the pump and in the turbine;

wherein transmission torque limit means is arranged between the stator and the housing to so limit the transmission of torque transmitted to the stator from the pump through the turbine as will not to increase in excess of a predetermined value.

It is desired that the transmission torque limit means comprises a one-way clutch supported by the housing and a torque limiter arranged between the one-way clutch and the stator, the stator is fixed to the housing through the torque limiter and the one-way clutch when the transmission of torque is not exceeding the predetermined value, and the stator runs idle relative to the one-way clutch due to the operation of the torque limiter when the transmission of torque is going to increase in excess of the predetermined value.

BEST MODE FOR CARRYING OUT THE INVENTION

The invention will be described in further detail with reference to the accompanying drawings illustrating a power transmission device equipped with a torque converter according to a preferred embodiment of the present invention.

Figure 1:
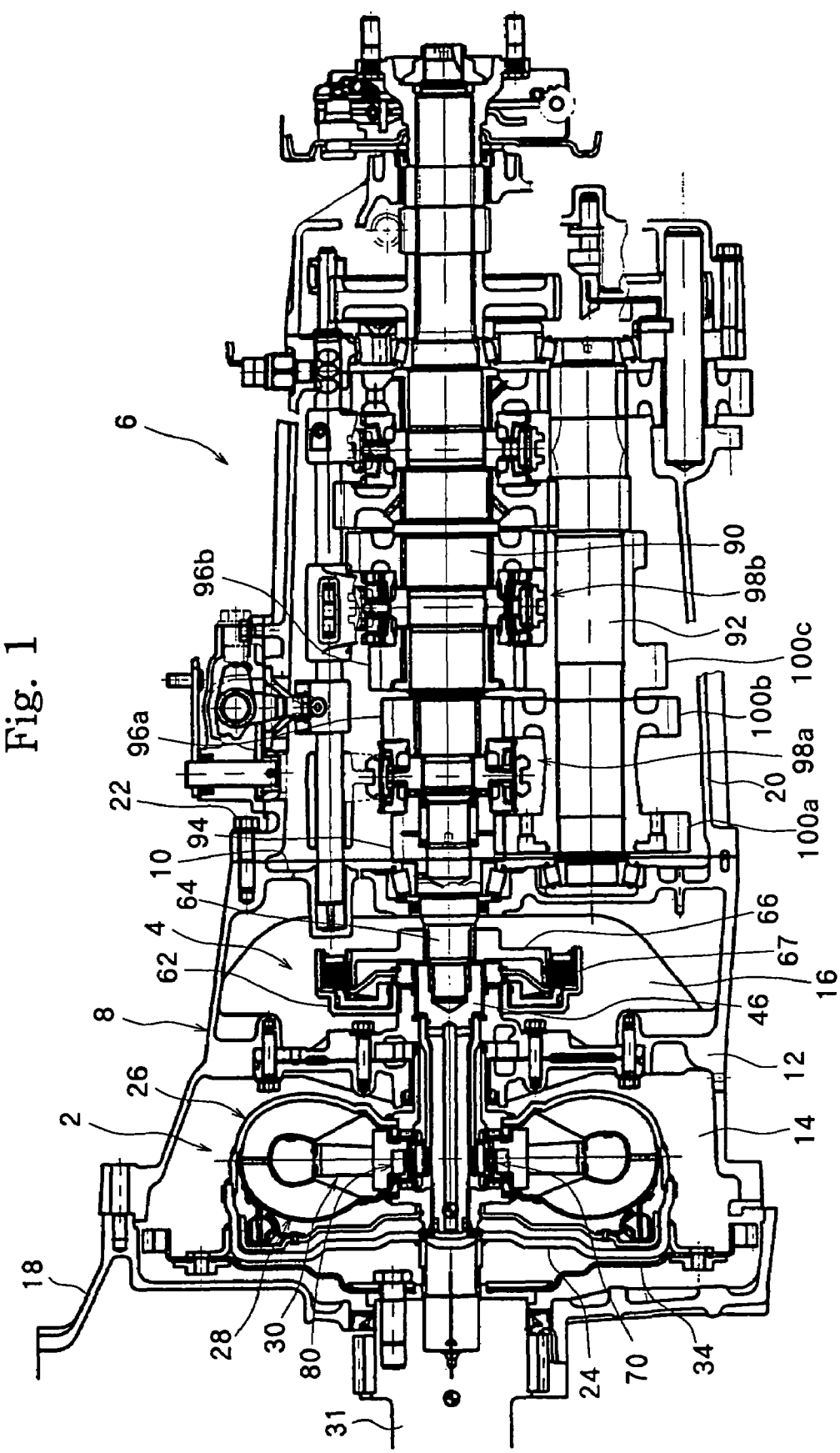
FIG. 1 is a longitudinal sectional view illustrating an embodiment of a power transmission device equipped with a torque converter according to the present invention.

FIG. 1 is a longitudinal sectional view of an embodiment of a power transmission device equipped with a torque converter constituted according to the present invention. The power transmission device shown in FIG. 1 is constituted by a diesel engine which is a prime mover that is not shown, a torque converter 2, a wet multi-plate friction clutch 4 and a manual transmission 6, which are arranged in series.

The power transmission device that is shown is equipped with a housing 8 which contains the torque converter 2 and the wet multi-plate friction clutch 4. The housing 8 is opened on one side which is on the engine side (left side in FIG. 1) and has a partitioning wall 10 on the other side which is on the transmission side (right side in FIG. 1). An intermediate wall 12 is provided at a central portion in the axial direction of the housing 8 which, therefore, is divided into a torque converter-containing chamber 14 and a friction clutch-containing chamber 16 by the intermediate wall 12 and by pump housings 50, 52 that will be described later. The thus constituted housing 8 has the engine side thereof which is mounted on a housing 18 that is mounted on the diesel engine by using such fastening means as bolts and the like which are not shown, and has the transmission side thereof which is mounted on a casing 20 of the manual transmission 6 by bolts 22.

Figure 2:
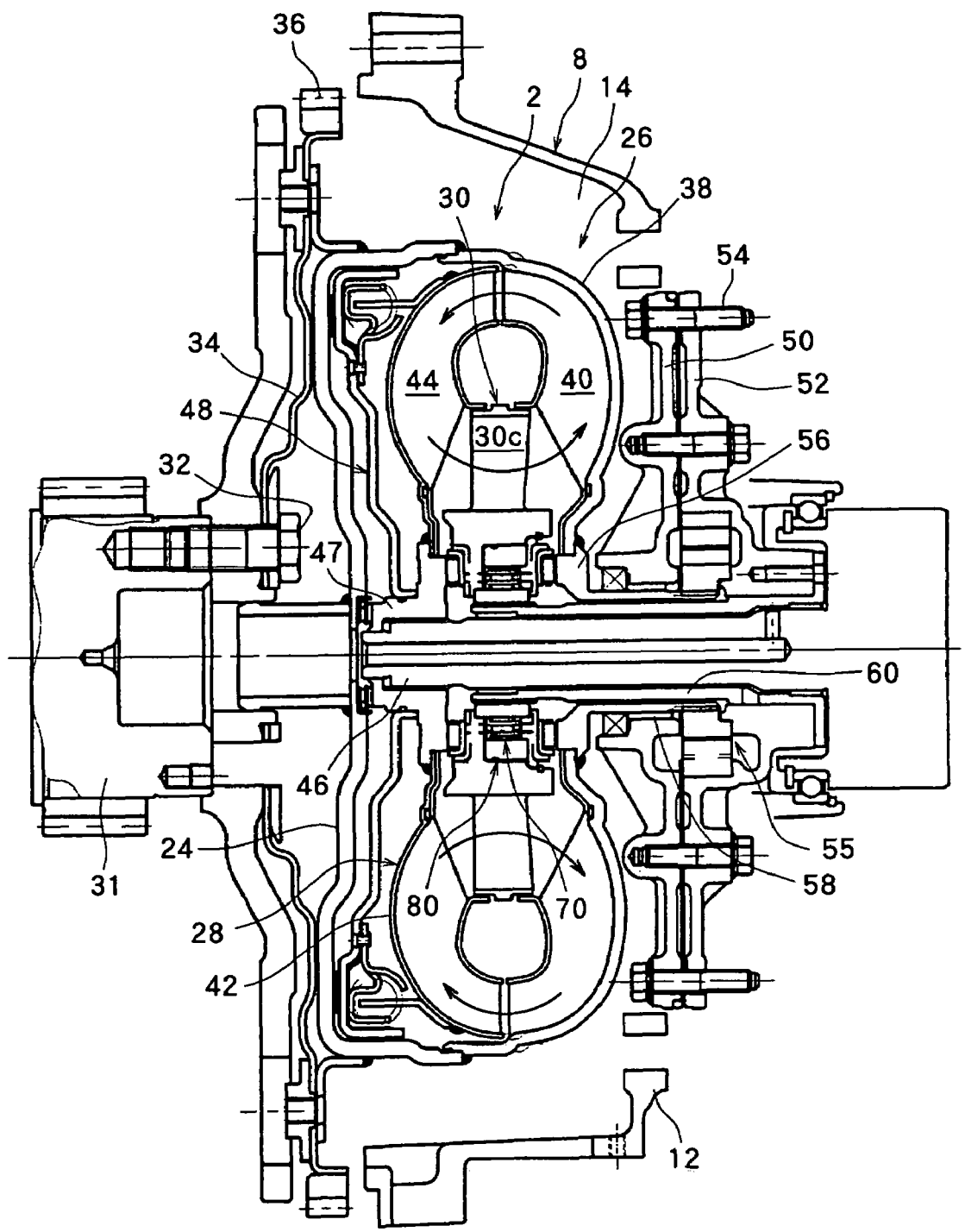
FIG. 2 is a longitudinal sectional view illustrating the embodiment of the torque converter shown in FIG. 1 on an enlarged scale.

The torque converter 2 will be described next with reference to FIGS. 1 and 2 and chiefly to FIG. 2. The torque converter 2 is arranged in the torque converter-containing chamber 14 of the housing 8. The torque converter 2 of the illustrated embodiment includes a casing 24, a pump 26, a turbine 28 and a stator 30. The casing 24 is mounted, by using fastening means such as bolts and nuts that are not shown, on the outer peripheral portion of a drive plate 34 that is mounted at its inner peripheral portion on the crank shaft 31 of the diesel engine by bolts 32. On the outer periphery of the drive plate 34, there is mounted a starting ring gear 36 that comes in mesh with a drive gear of a starter motor that is not shown.

The pump 26 is arranged facing the casing 24. The pump 26 includes an annular pump shell 38 and a plurality of impellers 40 radially arranged in the pump shell 38. The pump shell 38 is mounted on the casing 24 by such fixing means as welding. Therefore, the pump shell 38 of the pump 26 is coupled to the crank shaft 31 via the casing 24 and the drive plate 34. The crank shaft 31, therefore, works as an input shaft of the torque converter 2.

The turbine 28 is arranged in a chamber formed by the pump 26 and the casing 24, and is facing the pump 26. The turbine 28 includes an annular turbine shell 42 arranged facing the pump shell 38 of the pump 26, and a plurality of runners 44 radially arranged in the turbine shell 42. The turbine shell 42 is mounted, by such fixing means as welding, on a turbine hub 47 that is spline-fitted to an output shaft 46 arranged in concentric with the crank shaft 31 which is the input shaft. Reference numeral 48 denotes a lock-up clutch. The lock-up clutch 48 is a mechanism for directly coupling the casing 24 to the turbine 28, which by itself, however, does not constitute the feature of the present invention and is not described here in detail since it has been disclosed in the above JP-A-2002-276694.

On the intermediate wall 12 of the housing 8, there are mounted the pump housings 50 and 52 by such fixing means as bolts 54. Therefore, the pump housings 50 and 52 are dividing the torque converter-containing chamber 14 from the friction clutch-containing chamber 16 that are formed in the housing 8. A hydraulic pump 55 is arranged in the pump housings 50 and 52. The hydraulic pump 55 is constituted by a trochoidal pump equipped with an inner rotor and an outer rotor. Control valves are arranged and the operation fluid passages are formed in the pump housings 50 and 52. The hydraulic pump 55 arranged in the pump housings 50 and 52 is so constituted as to be rotated by a pump hub 56. That is, the pump hub 56 is constituted by a cylindrical portion and an annular flange portion extending outward in the radial direction from one end of the cylindrical portion, and the intermediate portion of the cylindrical portion in the axial direction thereof is supported by the pump housing 50 via a bearing 58 so as to rotate. The annular inner end of the pump shell 38 of the pump 26 in the radial direction thereof is fixed to the flange portion of the pump hub 56 by such fixing means as welding, and the other end of the cylindrical portion of the pump hub 56 is spline-coupled to the inner rotor of the hydraulic pump 55.

In the pump housings 50 and 52, there are formed intake passages which are not shown being communicated with the intake port of the hydraulic pump 55 and being opened facing the bottom wall portion of the friction clutch-containing chamber 16. In the illustrated embodiment, the operation fluid is contained in the fluid reservoir defined in the bottom of the friction clutch-containing chamber 16, and is sucked by the operation of the hydraulic pump 55.

The output shaft 46 is arranged at the center of the pump hub 56, and a cylindrical member 60 is arranged between the pump hub 56 and the output shaft 46. One end of the cylindrical member 60 is fixed to the pump housing 52 by such fixing means as bolts, and the other end of the cylindrical member 60 is supported by the outer peripheral surface of the output shaft 46 via a bearing so as to rotate relative thereto. Being thus fixed to the pump housing 52, it can be said that the cylindrical member 60 is part of the housing 8. One end of the output shaft 46 is supported by being spline-coupled to the central portion of the turbine hub 47, and the other end of the output shaft 46 is supported by the inner peripheral surface at the other end of the cylindrical member 60 via a bearing so as to rotate. The stator 30 of the torque converter 2 is supported by the outer peripheral surface at one end of the cylindrical member 60 via a one-way clutch 70 and a torque limiter 80 that will be described later. This constitution will be described later in detail.

The wet multi-plate friction clutch 4 includes a clutch outer 62 spline-coupled to the other end of the output shaft 46, and a clutch center 66 spline-coupled to the input shaft 64 of the transmission 6. Between the clutch outer 62 and the clutch center 66, there are arranged a hydraulic cylinder mechanism and a spring mechanism that are not shown to connect and disconnect the clutch outer 62 and the clutch center 66 via a plurality of friction plates 67. The wet multi-plate friction clutch 4 by itself does not constitute the feature of the present invention and is not described here in further detail since it has been disclosed in the above JP-A-2002-276694.

The stator 30 of the torque converter 2 will be described next with reference to FIG. 3. The stator 30 is supported by the housing 8 via the cylindrical member 60 and the pump housing 52. If described more concretely, the stator 30 is supported on the outer peripheral surface at an end of the cylindrical member 60 which is fixed to the pump housing 52 via the one-way clutch 70 and the torque limiter 80.

The one-way clutch 70 includes a cylindrical inner ring member 71 having a predetermined width in the axial direction, an outer ring member 72 fitted to, and supported by, the circular outer peripheral surface of the inner ring member 71 so as to rotate relative thereto and having a plurality of (six in this embodiment) recessed portions 73 on the inside in the radial direction thereof maintaining a distance in the circumferential direction, and rollers 74 and spring members 75 inserted in spaces formed by the outer peripheral surface of the inner ring member 71 and by the recessed portions 73 of the outer ring member 72. The outer ring member 72 has a predetermined width in the axial direction.

The inner ring member 71 and the outer ring member 72 are arranged on a common axis. Each recessed portion 73 in the outer ring member 72 includes one end surface 72a extending outward in the radial direction from an imaginary inner peripheral surface in concentric with the circular outer peripheral surface of the outer ring member 72, other end surface 72b substantially facing the one end surface 72a maintaining a distance in the circumferential direction, and a locking/unlocking surface 72c extending in the circumferential direction between the outer ends of the one end surface 72a and of the other end surface 72b in the radial direction.

The one end surface 72a is positioned on an imaginary surface that extends outward in the radial direction passing through the axis of the inner ring member 71. A region on the locking/unlocking surface 72c from one end surface 72a up to nearly the center in the circumferential direction, is formed as an arcuate surface, i.e., formed as the unlocking surface which is in concentric with the axis of the inner ring member 71, and a region from the center to the other end surface 72b is formed as a tilted surface, i.e., formed as the locking surface in a manner that the radius thereof gradually decreases from the center toward the other end surface 72b. The gap in the radial direction remains substantially constant between the outer peripheral surface of the inner ring member 71 and the unlocking surface, while the gap in the radial direction gradually decreases between the outer peripheral surface of the inner ring member 71 and the locking surface from the center toward the other end surface 72b.

Each roller 74 is of a circular shape in cross section having a predetermined diameter and a predetermined width in the axial direction, the diameter being slightly smaller than the gap between the unlocking surface of the corresponding recessed portion 73 and the outer peripheral surface of the inner ring member 71. Each spring member 75 is constituted by a compression coil spring, and is inserted between the one end surface 72a of the corresponding recessed portion 73 and the roller 74. The roller 74 is urged in the corresponding recessed portion 73 by the spring member 75 toward the other end surface 72b in the circumferential direction (locking direction) at all times.

Figure 3:
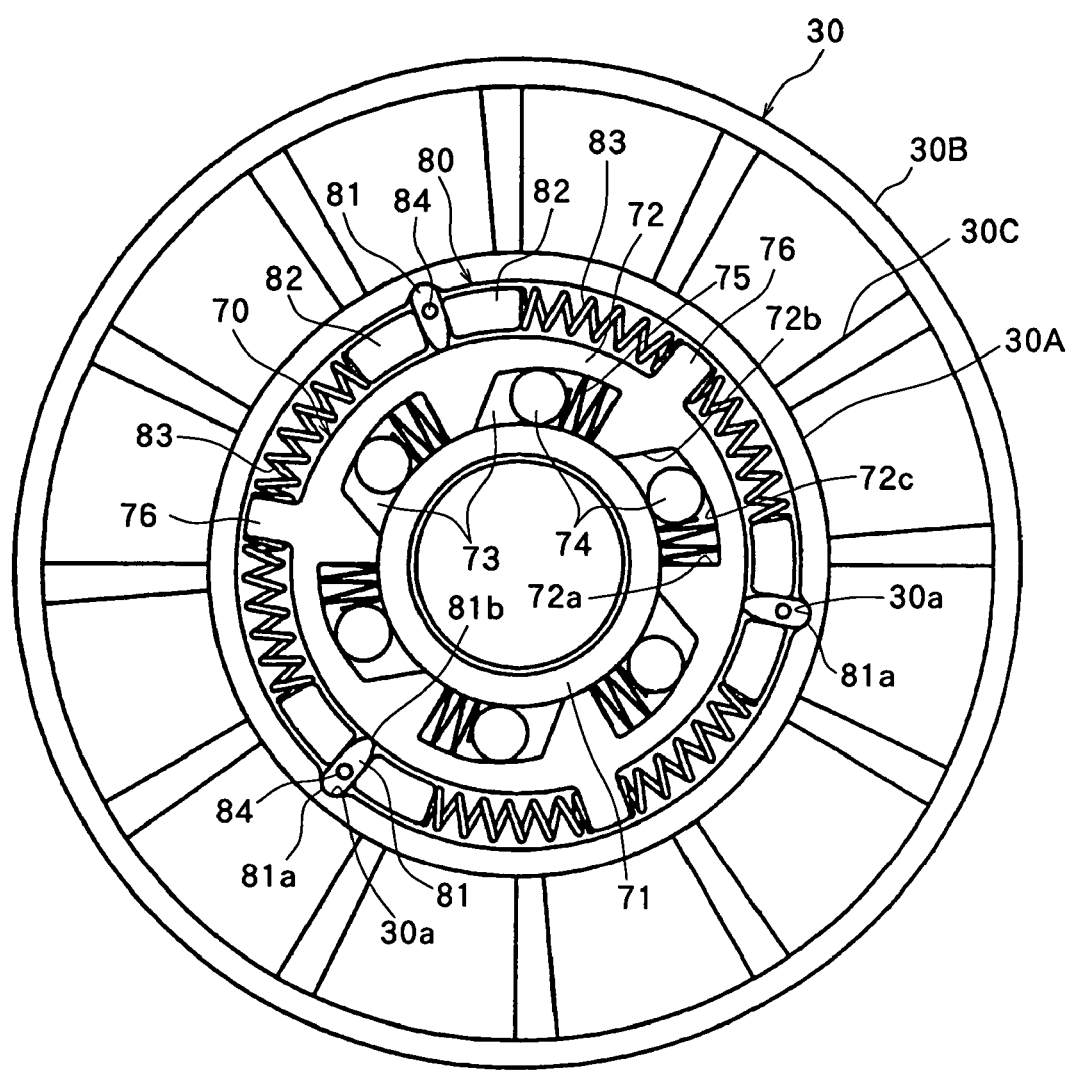
FIG. 3 is a transverse sectional view of a stator portion in the torque converter shown in FIG. 2 on an enlarged scale.

As will be easily understood from the foregoing description, when the outer ring member 72 rotates clockwise in FIG. 3 relative to the inner ring member 71, the rollers 74 in the corresponding recessed portions 73 bite into the gaps in the radial direction (gaps of a wedge shape in the circumferential direction as viewed from the axial direction) between the outer peripheral surface of the inner ring member 71 and the locking surfaces. Therefore, the outer ring member 72 is locked to the inner ring member 71. On the other hand, when the outer ring member 72 rotates counterclockwise in FIG. 3 relative to the inner ring member 71, the rollers 74 in the corresponding recessed portions 73 move into the gaps in the radial direction (constant gaps) between the outer peripheral surface of the inner ring member 71 and the locking surfaces. Therefore, the outer ring member 72 rotates relative to the inner ring member 71.

A torque limiter 80 is arranged on the outer side in the radial direction of the outer ring member 72 of the one-way clutch 70. The torque limiter 80 includes a plurality of (three in this embodiment) spring-receiving protuberances 76 protruding outward in the radial direction by substantially the same height from the outer peripheral surface of the outer ring member 72 maintaining an equal distance in the circumferential direction of the outer ring member 72, drive keys 81 arranged at the centers in the circumferential direction among the spring-receiving protuberances 76 facing each other in the circumferential direction, pairs of slide members 82 arranged on both sides of the drive keys 81 in the circumferential direction, and compression coil springs 83 arranged between the surfaces on one side of the spring-receiving protuberances 76 and the outer sides of the pairs of slide members 82 arranged on both sides of the drive keys 81 maintaining a distance in the circumferential direction. Each spring-receiving protuberance 76 has substantially a rectangular shape in transverse cross section. Each slide member 82 has nearly a trapezoidal shape in transverse cross section with it length in the circumferential direction of the surface which is on the inner side in the radial direction being slightly shorter than the length in the circumferential direction of the surface which is on the outer side in the radial direction.

Annular holder members that are not shown are arranged on both sides in the axial direction of the outer ring member 72 of the one-way clutch 70 so as to rotate together with the outer ring member 72. The rollers 74 and spring members 75 of the one-way clutch 70, and the slide members 82 and compression coil springs 83 of the torque limiter 80, are prevented by the holder members from escaping in the axial direction. When the one-way clutch 70 is viewed in the axial direction, each drive key 81 has a shape that is longitudinally elongated in the radial direction in transverse cross section including both side surfaces extending in the radial direction maintaining a nearly constant width in the circumferential direction, an outer end surface 81a in the radial direction and an inner end surface 81b in the radial direction, which are nearly of an arcuate shape. Each drive key 81 has the width in the circumferential direction which, at the inner end in the radial direction, becomes gradually narrow toward the inner end surface in the radial direction.

The thus constituted drive key 81 has nearly the central portion thereof that is arranged in the radial direction between the holder members and is supported so as to rotate about a shaft 84 that extends in parallel with the axis of the inner ring member 71. The slide members 82 are brought into pressed contact with both side surfaces of each drive key 81 with substantially the same spring force due to the compression coil springs 83. As a result, the drive keys 81 are held in a state of being erected in the radial direction as shown in FIG. 3. The outer end surface 81a in the radial direction of the drive key 81 is positioned at an outer end in the radial direction, and the inner end surface 81b in the radial direction thereof is positioned at an inner end in the radial direction and is directed to the axis of the inner ring member 71. The outer surfaces in the radial direction of the spring-receiving protuberances 76 and of the slide members 82 are positioned on an imaginary circle substantially in concentric with the inner ring member 71, and the outer end surfaces 81a of the drive keys 81 in the radial direction are protruding outward in the radial direction beyond the above imaginary circle by substantially the same distance. The inner surfaces in the radial direction of the slide members 82 are positioned maintaining a gap with respect to the outer peripheral surface of the outer ring member 72 on the outer side thereof in the radial direction. The inner end surfaces 81 in the radial direction of the drive keys 81 are brought into contact with the outer peripheral surface of the outer ring member 72.

The stator 30 is constituted by an inner ring 30A having a predetermined width in the axial direction, an outer ring 30B positioned on the outer side of the inner ring 30A in the radial direction in concentric therewith, and a plurality of vane members 30C arranged between the inner ring 30A and the outer ring 30B integrally therewith maintaining a distance in the circumferential direction. Though illustrated in a simplified manner, each vane member 30C has a curved surface forming predetermined flow passages in the axial direction in both surfaces thereof facing in the circumferential direction as is widely known. In the inner peripheral surface of the inner ring 30A, there are formed a plurality of (three in this embodiment) grooves 30a maintaining an equal distance in the circumferential direction. The grooves 30a have an arcuate surface in transverse cross section which is nearly the same as the arcuate surface of the outer end surface 81a in the radial direction of the drive keys 81, and are extending in the axial direction of the inner ring 30A. In a state where the drive keys 81 are held being erected in the radial direction as described above, the distances among the grooves 30a in the circumferential direction are specified to be substantially the same as the distances in the circumferential direction among the end surfaces 81a which are on the outer side in the radial direction of the drive keys 81. The grooves 30a of the inner rings 30A constitute a portion of the torque limiter 80.

The thus constituted stator 30 is mounted on the outer side in the radial direction of the outer ring member 72 of the one-way clutch 70 with the grooves 30a formed in the inner peripheral surface of the inner ring 30A being fitted to the outer end surfaces 81a in the radial direction of the corresponding drive keys 81 which are in the erected state. The inner peripheral surface of the inner ring 30A is positioned on the outer side of the above imaginary circle in the radial direction thereof. As shown in FIG. 2, the inner ring member 71 of the one-way clutch 70 is spline-coupled to an end of the cylindrical member 60 fixed to the housing 8, so as to be substantially fixed to the housing 8. The stator 30 which includes the vane members 30C is positioned between the pump 26 and the turbine 28. A plurality of rollers are arranged via suitable holding means between the turbine hub 47 and one of the annular holder members arranged on both sides in the axial direction of the outer ring member 72 of the one-way clutch 70, and between the other holder member and the pump hub 56. As a result, the outer ring member 72 is allowed to rotate relative to the turbine hub 47 and the pump hub 56. The one-way clutch 70 and the torque limiter 80 constitute transmission torque limit means. Here, basic constitutions of the one-way clutch 70 and the torque limiter 80 may be the known ones and, hence, there may be employed the one-way clutch and the torque limiter having any other constitutions.

Next, the manual transmission 6 will be described with reference to FIG. 1. The transmission 6 of the illustrated embodiment is a parallel shaft-type gear transmission which includes a casing 20, an input shaft 64 arranged in the casing 20 and mounting a clutch center 66 of the wet multi-plate friction clutch 4, an output shaft 90 arranged in concentric with the input shaft 64, and a countershaft 92 arranged in parallel with the output shaft 90. A drive gear 94 is arranged on the output shaft 90. On the output shaft 90, there are arranged speed change gears 96a, 96b, - - - as well as synchromesh devices 98a, 98b, - - - . On the countershaft 92, further, there are provided counter gears 100a, 100b, 100c, - - - that are in mesh with the drive gear 94 and with the speed change gears 96a, 96b, - - - at all times. Further, the manual transmission 6 may utilize a known constitution, and is not described here in further detain since it does not constitute a feature of the present invention.

The power transmission device equipped with the torque converter 2 of the illustrated embodiment is constituted as described above, and its operation will now be described. Referring to FIGS. 1 and 2, the driving force produced on the crank shaft 31 (input shaft) of the diesel engine is transmitted to the casing 24 of the torque converter 2 through the drive plate 34. The casing 24 and the pump shell 38 of the pump 26 are integrally constituted and, hence, the pump 26 is rotated by the driving force. When the pump 26 rotates, the operation fluid in the pump 26 flows toward the outer periphery along the impellers 40 due to the centrifugal force, and flows to the side of the turbine 28 as indicated by an arrow. The operation fluid that has flown to the side of the turbine 28, then, flows toward the inner peripheral side and flows into the stator 30 as indicated by an arrow. The operation fluid that has flown into the stator 30 from the turbine 28 changes its direction of flow due to the vane members 30C in the stator 30, and is returned back to the pump 26. The operation fluid returned back to the pump 26 from the stator 30 flows into the back surface side of the impellers 40 of the pump 26 (flows to the back side in the rotational direction).

Thus, the operation fluid circulates through the pump shell 38 and the turbine shell 42 passing through the pump 26, turbine 28 and stator 30, and the driving torque on the side of the pump 26 is substantially increased and is transmitted to the side of the turbine 28. The driving force transmitted to the side of the turbine 28, is transmitted to the output shaft 46 through the turbine shell 42 and the turbine hub 47, and is, further, transmitted to the transmission 6 through the friction clutch 4.

Figure 4:
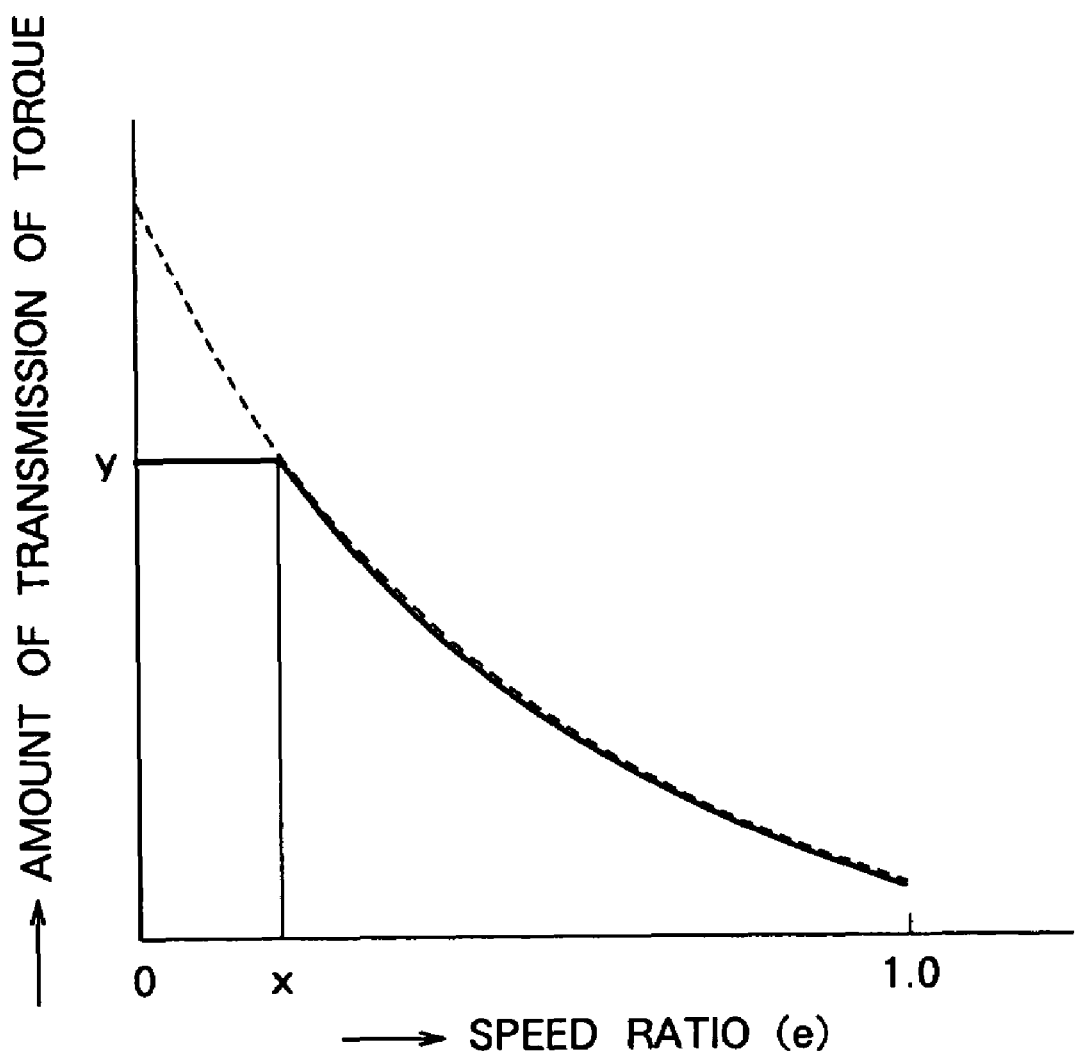
FIG. 4 is a diagram schematically illustrating characteristics of the torque converter constituted according to the present invention.

Next, described below with reference to FIGS. 1 to 4 are the torque transmission characteristics of the above torque converter 2. In FIG. 4, a dotted line represents general characteristics of the torque converter and a solid line represents characteristics of the torque converter according to the present invention, respectively and schematically, wherein the abscissa is a speed ratio (e)=(Nt/Np) specified by the rotational speed Np of the pump 26 and the rotational speed Nt of the turbine 28, and the ordinate is the amount of torque transmitted to the stator 30 from the pump 26 through the turbine 28. As will be understood from FIG. 4, the torque converter has such characteristics that the transmission of torque increases as the speed ratio (e) of the pump 26 and the turbine 28 approaches zero (0). When the torque converter having such characteristics is mounted on the power transmission device of a vehicle, the transmission of torque increases as the speed ratio (e) approaches zero (0), i.e., as the difference between the rotational speed Np of the pump 26 and the rotational speed Nt of the turbine 28 increases irrespective of the vehicle speed. Therefore, the transmission of torque becomes a maximum in a state where the engine is running while the vehicle is at a halt and the speed change gear of the transmission is engaged, i.e., in a state where the input shaft is rotating but the output shaft is at a halt. The transmission of torque approaches the maximum value, too, when the speed ratio (e) approaches zero (0) such as when the vehicle is quickly accelerated or when the vehicle is climbing a slope bearing an increased load.

Therefore, it becomes possible to satisfy the demand of imparting a torque range as wide as possible by using a single kind of transmission by employing a torque converter as the start clutch in the power transmission device used for a TC diesel engine of a small displacement. However, if the torque converter having the above general characteristics is simply used for the power transmission device which is combined with the manual transmission, the torque becomes so great on the side of the amplified output as to exceed a permissible limit of input of the transmission arousing a problem from the standpoint of strength.

In the torque converter 2 of the present invention, transmission torque limit means is arranged between the stator 30 and the housing 8 to limit the torque transmitted from the pump 26 to the stator 30 through the turbine 28 so will not to increase in excess of a predetermined value y (FIG. 4). As shown in FIGS. 2 and 3, the transmission torque control means is constituted by the one-way clutch 70 supported by the housing 8 and the torque limiter 80 disposed between the one-way clutch 70 and the stator 30, wherein, when the transmitted torque is not exceeding the predetermined value, the stator 30 is fixed to the housing 8 through the torque limiter 80 and the one-way clutch 70 and, when, the transmitted torque is going to increase in excess of the predetermined value, the torque limiter 80 so works that the stator 30 runs idle relative to the one-way clutch 70.

If described more concretely, the operation fluid circulates in the pump shell 38 and the turbine shell 42 passing through the pump 26, turbine 28 and stator 30, whereby the driving torque on the side of the pump 26 is substantially increased and is transmitted to the side of the turbine 28. Here, a rotational torque acts on the stator 30 in the clockwise direction in FIG. 3 due to the reaction of the fluid acting on the vane members 30C. The torque is transmitted to the one-way clutch 70 through the grooves 30a in the inner ring 30A, drive keys 81 of the torque limiter 80, slide members 82, compression coil springs 83, and spring-receiving protuberances 76 of the outer ring member 72 of the one-way clutch 70. As described earlier, the outer ring member 72 is locked to the inner ring member 71 through the rollers 74, and is locked to the housing 8 through the cylindrical member 60 and the pump housing 52. The stator 30 is fixed to the housing 8 and works to amplify the torque. Therefore, the transmission of torque increases as the speed ratio (e) approaches zero (0) as represented by a solid line in FIG. 4.

As the speed ratio (e) approaches zero (0), the reaction of the fluid acting on the vane members 30C of the stator 30 gradually increases. Here, as the speed ratio (e) reaches a predetermined value x close to zero (0), the drive keys 81 of the torque limiter 80 are rotated about the shafts 84 clockwise in FIG. 3, and are disengaged from the grooves 30a in the inner ring 30A. The stator 30 runs idle relative to the drive keys 81 of the torque limiter 80 and, hence, no longer works to amplify the torque. As a result, the transmitted torque does not increase in excess of the predetermined value y even when the speed ratio (e) approaches zero (0) exceeding the predetermined value x.

That is, when the speed ratio (e) is going to approach zero (0) in excess of the predetermined value x, the stator 30 runs idle relative to the one-way clutch 70 and no longer works to amplify the torque. Therefore, the torque is prevented from being transmitted in excess of the predetermined value y as represented by a solid line that extends nearly flat in FIG. 4. When the torque converter 2 having the above characteristics is used, therefore, the transmission of torque is controlled from exceeding the permissible limit of input to the transmission 6, making it possible to broaden the torque range of the transmission 6 within the permissible limit of input to the transmission 6. It is further made possible to decrease the drag torque down to a predetermined value y smaller than the maximum value, the drag torque being produced in a state where the engine is running while the vehicle is at a halt and the speed change gear of the transmission 6 is engaged, i.e., in a state where the input shaft 31 is rotating but the output shaft 46 is halting. When the speed ratio (e) varies to approach 1.0 from the predetermined value x, the drive keys 81 are brought into engagement again with the grooves 30a in the inner ring 30A due to the restoring operation by the compression coil springs 83 and the slide members 82 in the torque limiter 80, and the stator 30 starts amplifying the torque.

The invention claimed is:

1. A torque converter comprising:
   a pump including an annular pump shell mounted on a pump hub supported in a housing so as to rotate, and a plurality of impellers radially arranged in the pump shell;
   a turbine including an annular turbine shell arranged facing the pump and mounted on a turbine hub which rotates relative to the pump hub, and a plurality of runners radially arranged in the turbine shell;
   a stator, arranged between the pump and the turbine, and being supported by the housing; and
   an operation fluid filled in the pump and in the turbine,
   wherein transmission torque limit means is arranged between the stator and the housing so as to limit the transmission of torque transmitted to the stator from the pump through the turbine so as not to increase in excess of a predetermined value,
   wherein the transmission torque limit means comprises a one-way clutch supported by the housing and a torque limiter arranged between the one-way clutch and the stator, the stator is fixed to the housing through the torque limiter and the one-way clutch when the transmission of torque is not exceeding the predetermined value, and the stator runs idle relative to the one-way clutch due to the operation of the torque limiter when the transmission of torque is going to increase in excess of the predetermined value.

* * * * *